June 23, 1970  F. J. LARKIN  3,516,545
WASTE TREATMENT APPARATUS
Filed Oct. 11, 1968  4 Sheets-Sheet 1
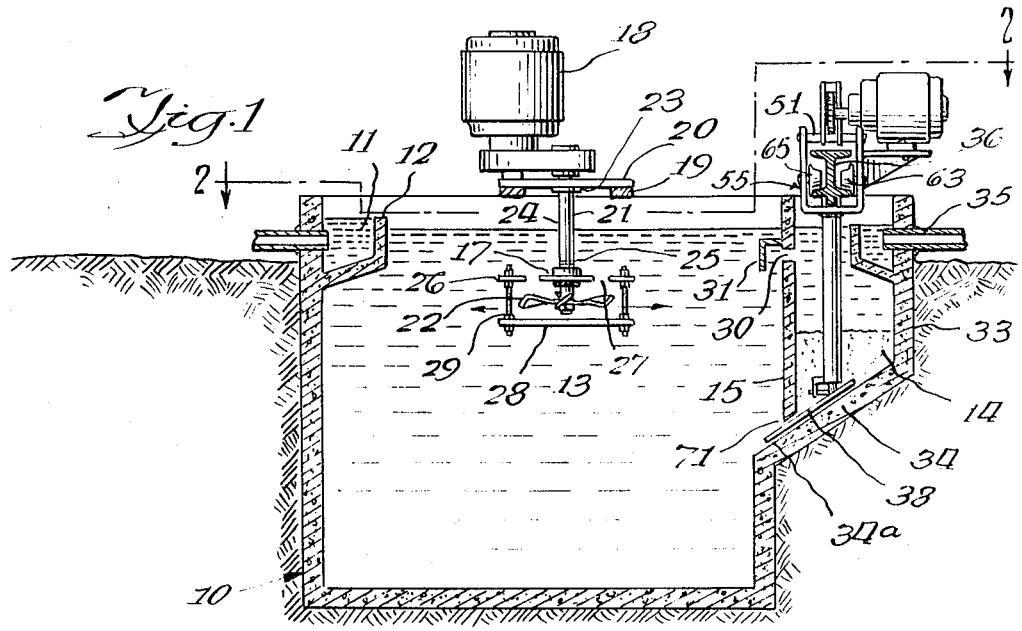
Fig. 1
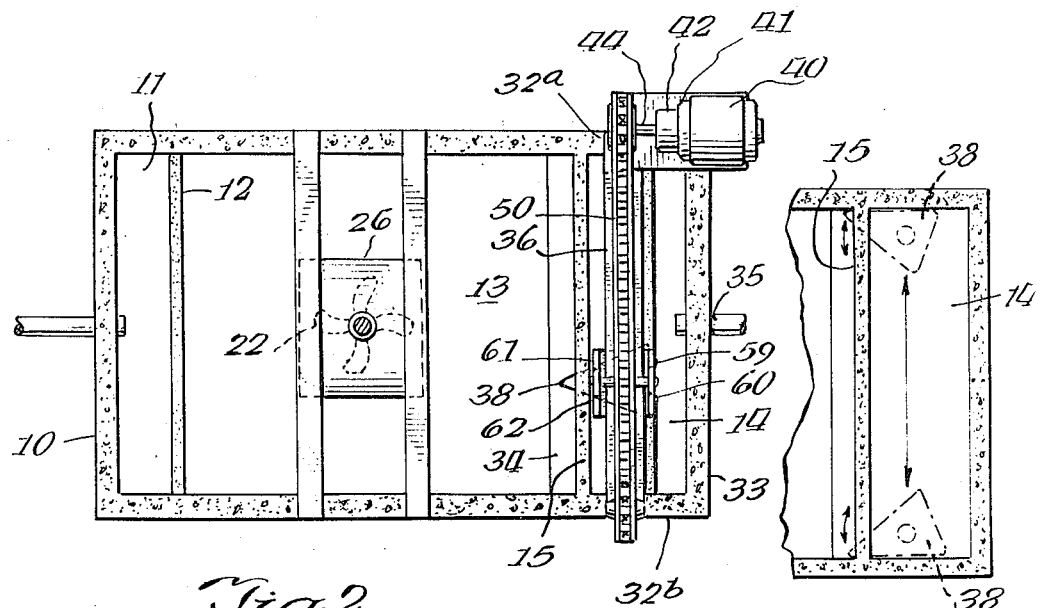
Fig. 2
Fig. 2a
INVENTOR
*Francis J. Larkin*

INVENTOR
Francis J. Larkin

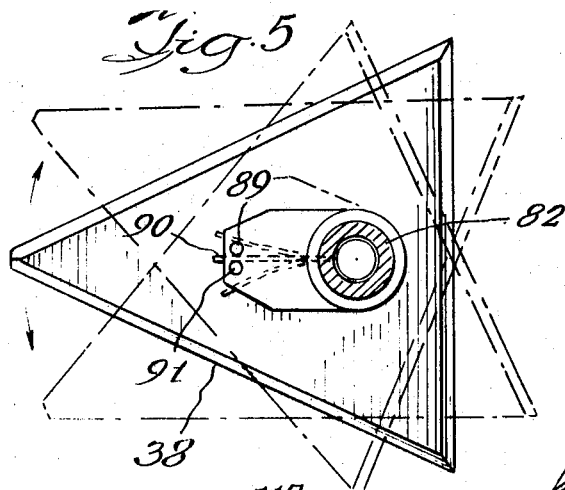
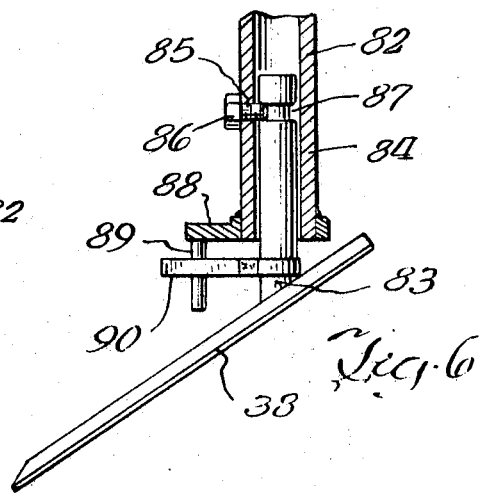
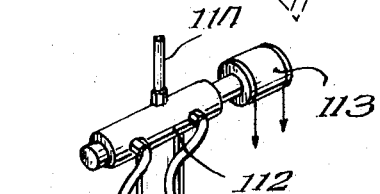
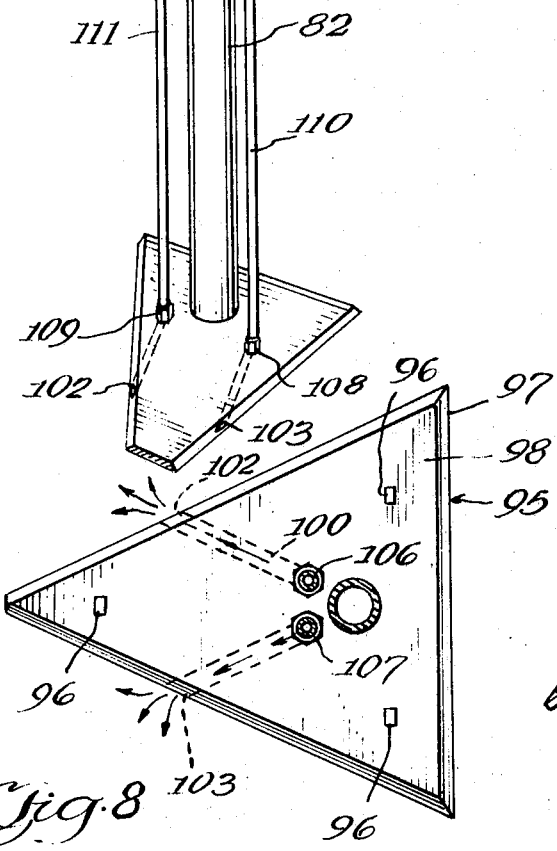
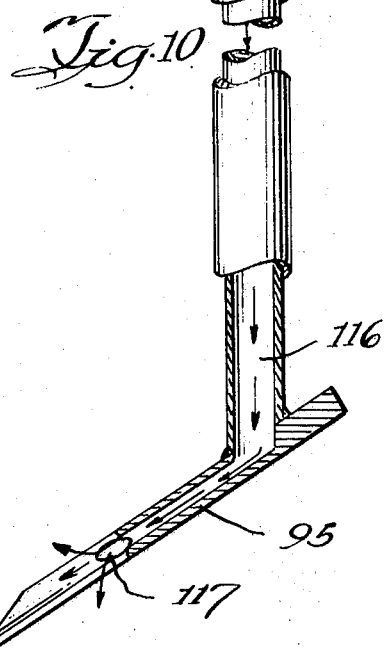

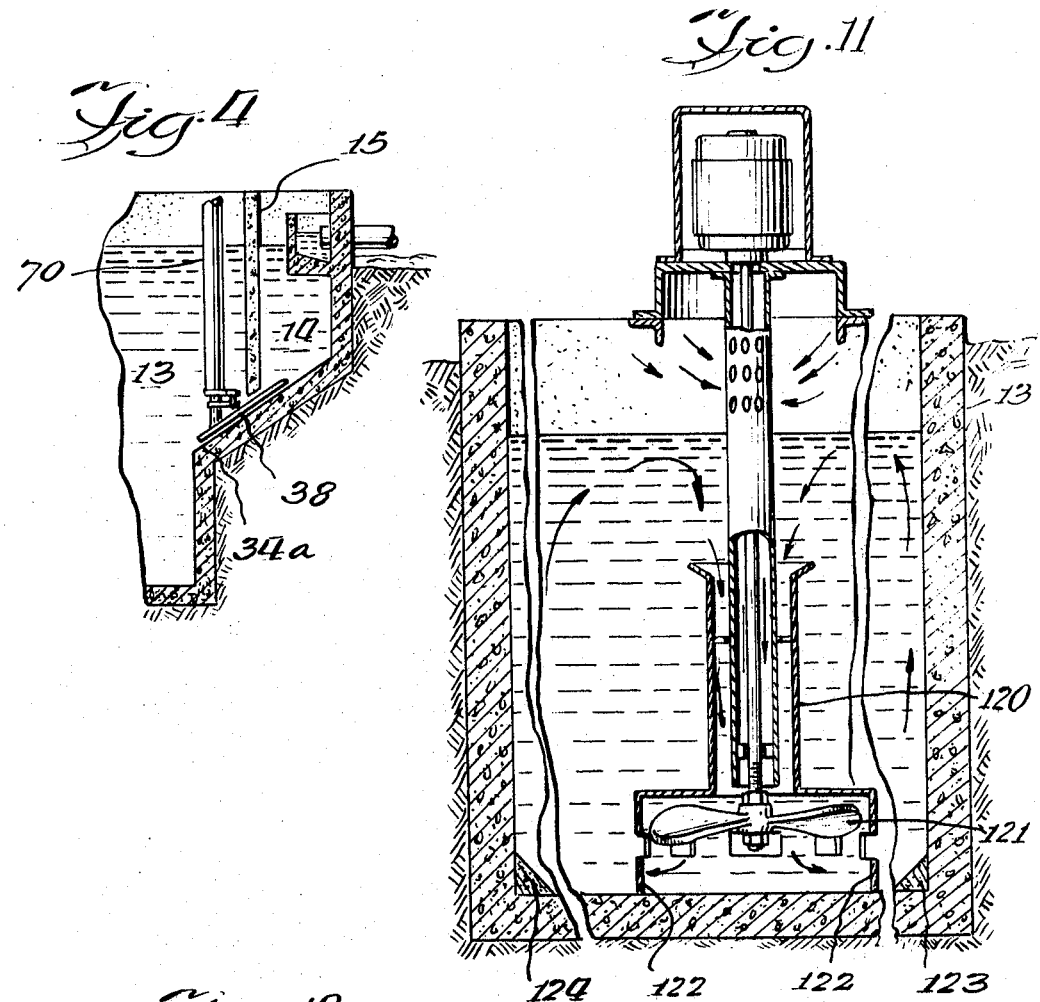

United States Patent Office 3,516,545
Patented June 23, 1970

3,516,545
WASTE TREATMENT APPARATUS
Francis J. Larkin, 1707 N. 78th Ave.,
Elmwood Park, Ill. 60635
Continuation-in-part of application Ser. No. 502,354,
Oct. 22, 1965. This application Oct. 11, 1968, Ser.
No. 766,874
The portion of the term of the patent subsequent to
Jan. 14, 1986, has been disclaimed
Int. Cl. B01d 21/04; C02c 1/10
U.S. Cl. 210—195                                   12 Claims

ABSTRACT OF THE DISCLOSURE

An apparatus for treating waste materials such as sewage having side by side aeration and settling tanks with a common wall therebetween and upper and lower ports connecting the tanks, the lower port for return of sludge being below the bottom of the common boundary and the sloped settling tank bottom having the lowest point thereof adjacent the lower port. Air dispersers are positioned in the aeration tank and scraper means move longitudinally in said settling tank to sweep return sludge through said lower port beneath the common wall into the aeration tank.

---

This application is a continuation-in-part of my United States application Ser. No. 502,354, filed Oct. 22, 1965, and entitled, Waste Treatment Process and Apparatus, now United States Pat. No. 3,422,007, issued Jan. 14, 1969.

This invention relates to a process for the treatment of waste materials. Mor particularly, it relates to an activated sludge type treatment of sewage and industrial waste. Still more particularly, it relates to an activated sludge process wherein the sludge is limited to a definite short time of settling and then moved directly from the settling zone by means providing for submerged introduction to a zone of complete mixing and aeration and to apparatus for accomplishing the processing of sewage.

In accordance with this invention, a method of treating sewage and industrial waste to accomplish high removal of Biochemical Oxygen Demand (B.O.D.) is provided. The method involves aeration and settling operations wherein oxygen is dispersed in the mixed liquor in quantities to satisfy a substantial portion of the B.O.D. by means which disperses it in bubble form in the liquid medium and the settling operation is of the type wherein sludge is limited to a short residence time by a scraper unit which traverses the width of the settling zone on a periodic cycle and forces the settled sludge down an inclined plane which forms the settling zone bottom and extends under a baffle separating the aeration and settling zones and into the aeration zone as a shelf capable of acting as a guide for directing recycle of a concentrated sludge into the aeration zone.

The apparatus of this invention comprises aeration and settling tanks aligned about substantially parallel axes and separated by a common wall partition, said settling tank having a sloping bottom with the low point thereof at an elevation intermediate the normal liquid level of and the bottom of said aeration tank and adjacent the common wall partition, a slot in said common wall partition extending horizontally the length of said partition at an elevation immediately above the line of intersection of said sloping bottom of said settling tank with said common wall partition, means for supplying aqueous waste material to said aeration compartment, liquid communication means for discharging aqueous material from said aeration compartment to said settling compartment, scraper means movable in said settling compartment a distance coextensive with the length of said slot, said scraper means having a height providing a clearance within said slot and being of a length to extend along the portion of the sloping bottom of said settling tank adjacent said common wall partition and at least to the aeration tank side of said slot whereby sludge is directed through said slot, means for aerating the contents of said aeration tank, means for conducting a portion of the sludge concentrated in said settling tank to waste and means for discharging clarified liquid from said settling tank.

In the treatment of waste materials by the activated sludge system, the completeness of B.O.D. removal is dependent upon the minimum time of treatment, the minimum level of dissolved oxygen being maintained in dispersed form in the mixed liquor, the quantity of sludge being recycled, the condition of the recycled sludge and the concentration of solids in the mixed liquor which is controllable, at least in part, by the amount of sludge wasted from the system.

Basic problems in the activated sludge type system are the complexity and size of the system required for efficient operation and for maintaining the sludge in a highly active condition through continuous intimate contact with oxygen.

Plants for the treatment of aqueous wastes of a size for the treatment of sewage from individual installations where the number of people involved is limited, for example, 25 to 1000, have not been looked upon with favor because the scaled-down versions of conventional activated treatment type plants have been exorbitantly expensive per unit of capacity to build, to maintain and to operate because scaled-down plants have not been reduced in functional components, in the need for trained operators, in the relatively high power cost, and the like.

Another serious problem has been sludge handling. Sludge contains aerobic organisms which only develop in the mixed liquor in an aeration zone where there is an adequate supply of nutrients and oxygen at all times. When the mixed liquor passes from the aeration zone to a settling zone, the sludge settles at the bottom of the settling zone wherein anaerobic conditions can develop due to depletion of the dissolved oxygen content of the liquid. If held too long under the anaerobic conditions, the organisms undergo a transformation after which it is difficult to restore their previous active condition and they become relatively ineffective in the propagation of the reaction whereby B.O.D. is removed.

In addition, an activated sludge plant's sludge is generally collected in flat bottom settling tanks provided with various types of equipment to move the sludge to a sludge collecting zone and a pumping system such as an air lift for removing the sludge from the collecting zone of the settling tank so that it can be returned to the aeration zone. If the collecting and removal of sludge is not properly sequenced, appreciable portions of sludge can remain in a final tank for a sufficient time to become septic in which condition the sludge is difficult to settle and in floating interferes with the settling operation.

Where the is no central sewage treatment plant, it is necessary to install septic tanks or other means to handle the sewage and other waste materials on a small quantity basis. While such septic tanks can handle minor amounts of waste products, the waste materials must be allowed to remain in the septic tank for a considerable length of time so that an anaerobic decomposition of the waste material occurs. The length of time required for such anaerobic decomposition limits the quantities of material which can be handled and with fluctuating loads may pass effluent which still contains harmful matter.

Now it has been discovered that an economical and practical waste treating system which is more efficient than the septic tank process and does not need expensive underground tile fields or other arrangements for effluent disposal and which at the same time can be manufactured in a variety of small sizes and installed at a reasonable cost due to the processing unit being simplified to require actuation by, for example, as few as two electric motors for the continuous operation of the integrated aeration and settling steps. This waste treatment process provides mixing with proper amounts of recycle sludge whose aerobic character remains unaltered due to the fact that the residence time in the settling zone has been limited to less than an hour, the exact residence generally depending upon the size of the settling tank and, preferably, being limited to about 10 minutes to 20 minutes.

The method of this invention for treating aqueous waste material comprises establishing side-by-side aeration and settling zones with a common wall therebetween. The bottom of said settling zone is positioned above the bottom of said aeration zone, and has said zones communicating in two locations through said common wall below the normal liquid levels prevailing in said zones. The first of these communications between zones is in the upper portion of said zones and provides for transfer of liquid from the aeration zone to the settling zone. The second of these communications between zones is immediately above the bottom of said settling zone and provides for transfer of fluid material from said settling zone to said aeration zone. The second communication is formed between the bottom of the common wall and an extension of the bottom of said settling zone sloping in the direction of the aeration zone so as to provide a longitudinal trough whose lowest point within the settling zone is adjacent said common wall. In the aeration zone there is established a mixture of waste material and sludge. This mixture is mechanically mixed with atmospheric air in quantities sufficient to satisfy a major portion of the B.O.D. of the mixture. Treated mixture, discharged through said baffled ports to the settling zone, separates into a clarified liquid and a concentrated sludge. The sludge settling at the bottom of said settling zone is conveyed to said aeration zone through said second communication by the action of scraper means which moves the sludge from any area of deposition on a time cycle of at least once in each preestablished period. Clarified liquid in the upper portions of said settling zone is discharged to waste over a suitable weir or by other suitable means.

The apparatus designed for carrying out the above process for treating waste material comprises a tank with one sidewall formed as two spaced portions. Generally the tank has one portion of the sidewall offset laterally intermediate its length with the upper portion of said wall spaced outwardly relative to the lower portion thereof. These offset walls are joined by an offset wall portion sloping downwardly from the lower edge of the upper wall portion to the upper edge of the lower wall portion. The tank itself is divided into aeration and settling compartments. The second of the spaced portions may in this embodiment be a substantially vertical baffle extending upwardly from a point adjacent said sloping wall portion in a position generally intermediate the vertical axes of said upper and lower portions of said sidewall of said tank. The vertical baffle has the bottom thereof spaced from said sloping portion of said wall a distance providing a predetermined clearance, i.e., a distance which permits a scraper to pass underneath said baffle while approaching close to but not touching the baffle. Aqueous waste material to be treated in said aeration compartment is supplied thereto through suitable conduit means or conduit channels or equivalent means. Centrally located in said aeration compartment is a unit for mechanically mixing atmospheric air with liquid material in said aeration compartment. Generally, this mechanical mixer has the unit for discharging liquid-air mixture radially, positioned below the normal liquid level of said compartment and in the upper portion thereof, although with special bottom arrangements for the aeration compartment, the mechanical mixer may be extended to a position adjacent the bottom of said compartment.

Aerated mixture is discharged from said aeration zone to said settling zone through a liquid communication means such as a baffled port. Sludge concentrating in the bottom of this settling compartment is moved from its original point of deposition by scraper means of a length to extend along a part of said sloping offset wall and at least to the aeration side of said baffle and of a height clearing the bottom of said baffle. This scraper means acting on the sludge accumulating adjacent said sloping bottom of said settling compartment sweeps it underneath the baffle wall and causes the sludge to slide down the extension of the slanted bottom of said settling compartment to a drop off point where it will be picked up by the circulating liquid in the aeration comparment. Any excess of sludge over that required to maintain the solids concentration of the aeration compartment is discharged to waste through suitable means such as a valved conduit communicating with the sloping bottom of said settling compartment. Clarified liquid accumulated at the upper portion of the settling compartment is discharged by suitable means, such as a weir or equivalent conduit means.

In carrying out such a process, aqueous wastes are processed in plants which give highly efficient aerobic treatment and flexibility to accommodate a wide range of daily flow due to simplicity of design, by combining an aeration zone in which the tank contents are maintained aerated and in circulation by a rotor member located below the liquid level in the aeration zone, said rotor element being adapted to create cavitation and to bring air from the atmosphere to the cavitation zone where it can be mixed with liquid by the rotor element and a mixture of liquid medium and dispersed bubbles of air discharged to the surrounding aeration zone contents, with a settling zone, the lowest point of which adjoins a relatively small unobstructed opening into the side of said aeration zone at a point appreciably above the bottom of said aeration zone, said settling zone having the bottom thereof formed as an inclined plane slanting downwardly to the unobstructed opening and having an extension of the inclined plane forming the bottom of said opening and extending into the aeration tank to form a shelf protecting the opening against eddy currents which could interfere with movement of sludge through said opening. The settling zone is provided with traveling scraper means operating in the longitudinally directed trough bottom of the settling zone or compartment and generally extending through said opening and along the shelf, capable of forcing movement of the concentrate of sludge down the inclined plane to the point of mixing with circulating aeration tank contents.

More in detail, in one mode of operation, the process of treating sewage comprises introducing sewage, the insoluble solids of which are usually in comminuted form, into an aeration zone in one of two contiguous zones or tanks. The B.O.D. removal to be achieved will be in the range between about 70% and 95%. Sewage is introduced into the aeration zone and mechanical aeration effected on a continuous basis to maintain an oxygen content in the mixed liquor in the aeration zone of at least 3 p.p.m. and preferably in the range between about 4 and 6 p.p.m. B.O.D. loading of the aeration zone is generally in the range between about 100 pounds and 300 pounds of B.O.D. per 1000 cubic feet of aeration zone volume, although the loading may be higher.

Sewage may be introduced into the aeration zone by any suitable means such as by overflowing a weir. Liquid medium is transferred from the aeration zone to the settling zone by suitable means such as a baffled aperture or apertures in the wall between the aeration zone and the settling zone.

The settling zone is bounded on one side by the wall separating the aeration and settling zone which extends downwardly to an opening such as a relatively narrow slot. The bottom of this slot is an extension of the inclined bottom of the settling zone which is slanted downwardly so that the low point of the settling zone is adjacent the slot. This slanting bottom may vary in angle from about 30 to 70 degrees from the horizontal.

Aerated mixture is introduced into this type settling tank generally, a substantial distance below the liquid surface so that the settling zone will act as an upflow clarifier with sludge accumulating in the longitudinally extending trough bottom and clarified liquid overflowing a weir or other suitable means positioned adjacent the liquid surface for removal of liquid.

In order to insure maintenance of a proper concentration of solids in the aeration tank, sludge is returned from the settling tank in amounts varying usually from about 50% to 500% by volume based upon the incoming flow of raw sewage to the aeration compartment. Partial control of the amount of sludge returned is provided by withdrawal of quantities of concentrated sludge to waste which are in excess of that required to insure maintenance of the predetermined B.O.D.-solids ratio in the aeration zone.

To provide for continuous movement of sludge having a maximum residence time in the settling zone of, for example, thirty minutes, from the settling zone to the aeration zone, a scraper unit is provided to move the sludge incrementally from all portions of the settling zone by a scraper adapted to move longitudinally at a rate generally of 1 to 5 feet per minute, back and forth over a distance generally of about 5 to 25 feet of the length of the settling zone, a rate which does not stir up the sludge in a manner interfering with the settling operation. If the settling zone has a length greater than about 25 feet, a multiplicity of sludge removal units are utilized, each to reciprocate back and forth over a fixed length of the settling zone. Each scraper unit should cycle back and forth at a rate to insure that each portion of the slanting floor of the settling zone is swept at least once every 15 to 30 minutes.

The apparatus adapted to carry out this process will be better understood from the following description of embodiments of the invention, wherein like parts are assigned the same number, taken in conjunction with the accompanying drawings in which:

FIG. 1 is a vertical elevational view of the tank;

FIG. 2 is a top plan view of contiguous rectangular aeration and settling tanks along the line 2—2 of FIG. 1;

FIG. 2a is a partial top plan view of the settling tank of FIG. 2 showing the scraper position at the extremities of its travel with the drive structure removed;

FIG. 4 is a partial vertical elevational view of an embodiment of the invention having the scraper suspended on the aeration tank side of the baffle;

FIG. 5 is a schematic top plan view of a scraper equipped with a spring element to permit swivel action and return the scraper to its preset position;

FIG. 6 is a schematic view of the scraper shown in FIGS. 2 and 4;

FIG. 8 is a schematic top plan view of a scraper equipped with air jets to implement movement of sludge;

FIG. 9 is a perspective view of a solenoid valve adapted to alternately direct air to one or the other of the air jets shown in FIG. 10;

FIG. 10 is a broken side elevational view partly in section of a scraper unit formed integral with the post support and adapted for discharge of air continuously through jet ports which are positioned directly beneath the baffle separating the aeration and settling tanks;

FIG. 11 is a vertical elevational view showing an embodiment of the invention having the aerator extending to the bottom of the aeration tank; and FIG. 12 is a vertical elevational view showing an embodiment of the invention having a combination of aeration means.

Figure 3:
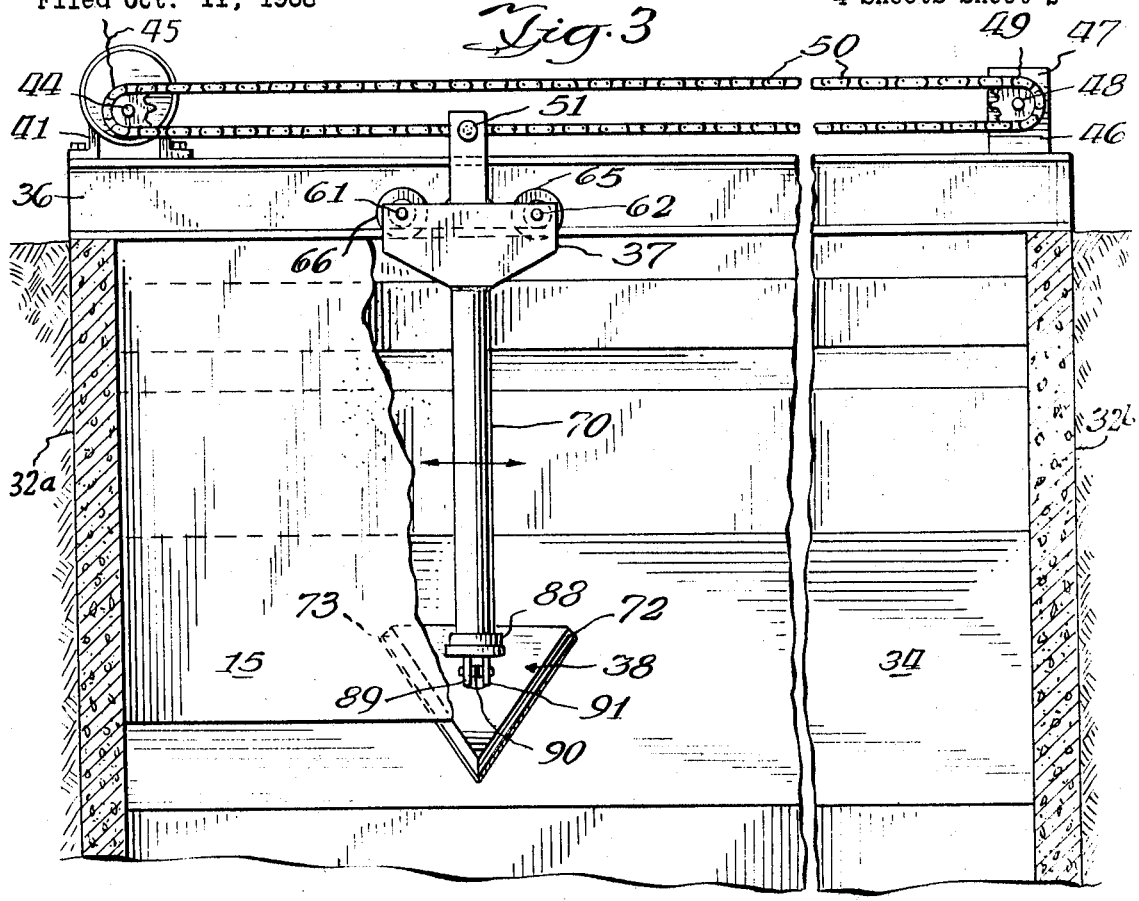
FIG. 3 is a partial elevational view of the apparatus for moving the scraper.
Figure 7:
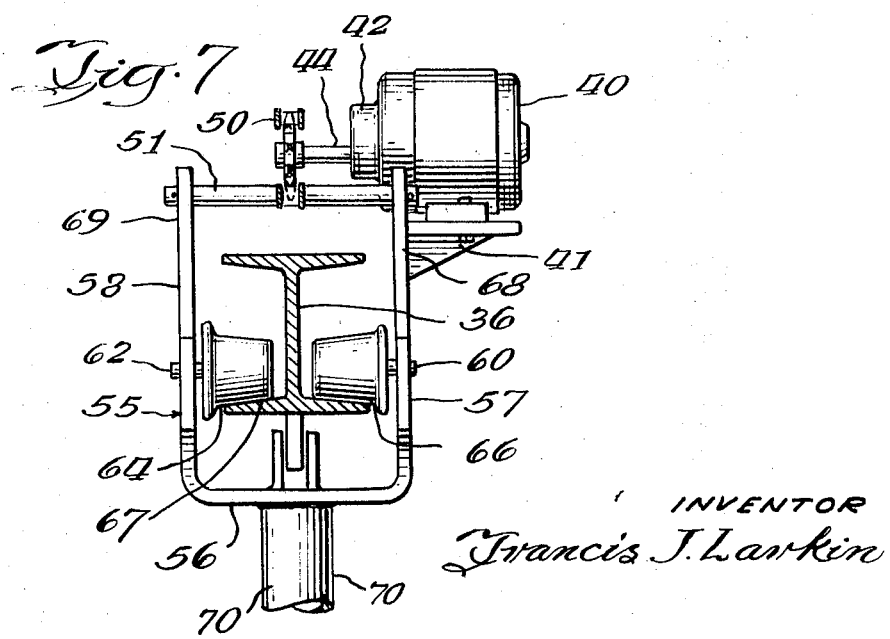
FIG. 7 is an enlarged partial side elevational view of the support beam and trolley support for traveling scraper.

In the drawings, referring specifically to FIGS. 1, 2, 3 and 7, the numeral 10 indicates a tank of suitable material of construction such as concrete or steel. Sewage is introduced into tank 10 through influent channel 11 which permits flow into the tank over a weir 12. Tank 10 is divided into an aeration compartment 13 and a settling compartment 14 by a common wall or baffle 15.

Aeration in tank 13 is effected by introduction of air by mechanical means 17. This mechanical means comprises a motor 18 supported above the liquid level of the tank by suitable means 19 such as spaced beam members resting for support on the end walls of tank 13 and a cross support plate 20. Motor 18 drives a rotatable hollow shaft 21 extending downwardly to a point below the liquid level in tank 13 which may be directly driven or indirectly driven through a belt and pulley arrangement. Shaft 21 has at its lower end blades 22 which extend radially from the shaft 20. The hollow shaft 20 is open to the atmosphere at its upper end and open to a cavitation zone at its lower end.

Secured to the lower side of plate 20 by suitable means such as a flange 23, is a tube 24 which surrounds and extends substantially the length of the shaft 21 and provides a liquid tight enclosure for the shaft. A lower end bearing 25 journals the shaft 21 within the tube 24.

Tube 24 has secured to its lower end a circumferentially flanged plate 26 provided with an annular opening 27 which automatically permits flow of liquid to the blade area. Below the plate 26 is a plate 28 secured in the spaced position by a plurality of spacing member 29 which connect plates 26 and 28. The spacing members may be threaded members which are secured to the plates by nuts or other suitable means.

Due to the action of the aeration means, liquid and air are mixed in the zone between plates 26 and 28 and discharged horizontally into the main body of liquid in tank 13. Other arrangements, such as closing one area between the plates, are possible to alter the pattern of liquid circulation in the tank 13.

The baffle 15 which divides the tank is provided with an upper opening 30 which is somewhat below the liquid level of tank 13 and also below the liquid level in tank 14. Upper opening or port 30 is provided with suitable means 31 such as a baffle to provide a circuitous flow path and to eliminate turbulence from the liquid passing from the aeration tank 13 to settling tank 14.

Settling compartment 14 is provided with end walls 32a and 32b, a sidewall 33 and an inclined bottom wall 34 which has a portion 34a extending into aeration tank 13 as a shelf. Sidewall 33 is adapted with one or more ports 35 or other suitable means for discharge of effluent to a suitable receiving body.

End walls 32a and 32b support a beam or rail member 36. Beam member 36 supports a suitable moving member 37 for scraper means 38 operating adjacent the bottom of the settling tank 14. A power source, such as an electric motor 40 is secured to and supported on a bracket 41 which is fixed to and supported by one end of beam member 36. Also supported on the bracket 41 is a conventional gear reduction unit 42. The drive shaft of motor 40 is connected by a suitable coupling to the input shaft of the gear reduction unit 42. The gear reduction unit 42 has an output shaft 44 upon which is mounted a sprocket wheel 45.

Beam member 36 at its end which is supported by wall 32b has mounted thereon a bracket 46 for support of a bearing assembly 47 in which is journaled a shaft 48. Shaft 48 has splined thereto an idler sprocket wheel 49. And endless chain 50 is trained over the sprocket wheels 45 and 49 and has the ends thereof pivotally connected to a pin 51 supported by moving member or trolley 37. Electric motor 40, which drives the actuating chain 50 may be of the reversing type whose rotation in each direction is controlled by limit switches, but, if desired, mechanical means for periodic reversal of direction of movement of chain 50 may also be used.

Trolley 37 includes a frame 55 of a U-shaped cross section having a bottom 56 which is disposed beneath the beam member 36 and sides 57 and 58 which straddle and are spaced from said beam member 36. Side 57 supports inwardly extending axles 59 and 60 and side 58 supports inwardly extending axles 61 and 62 with journals adjacent each end thereof. Axles 59, 60, 61 and 62 support flanged wheels 63, 64, 65 and 66, respectively. The flanged wheels straddle the web of beam member 36 and rest upon the bottom flange 67 thereof. Thus, the trolley is supported for free travel adjacent the wall 15. Sides 57 and 58 are provided with ears 68 and 69 which extend above the top of the beam member 36 and are adapted to support pin 51 to which the ends of chain 50 are secured.

A rigid shaft 70 is supported by trolley 40 in a position suspended below the beam member 36. This shaft 70 supports scraper means 38 at the lower end thereof positioned adjacent the inclined bottom wall 34.

Scraper means 38 is of a length to scrape an appreciable length of the bottom wall 34 of tank 14 in the vicinity of the vertical wall 15 which terminate short of inclined bottom 34 to form a slot 71. Scraper means 38 extends a length usually adapting it to pass through the slot 71 and along at least part of the extension or lip 34a. Scraper means 38 has preferably concave sides 72 and 73, i.e., the faces grooved with the edge of the top surface extended beyond the position of the edge of the bottom surface, so that sludge is subjected to a plowing effect and the cross-sectional thickness is such that there is only a slight clearance with the bottom of wall 15 so that plowed sludge is directed through the slot 71 and out of settling tank 14 and any tendency to agglomerate and to plug slot 71 is prevented.

Referring now to FIG. 4, tanks 13 and 14 are separated by the wall 15 as in FIG. 1. In this embodiment, the trolley member is positioned on the aeration tank side and adjacent to the wall 15. Depending from trolley member 37 is the shaft 70 which supports at its lower end scraper means 38 in a configuration to allow pivoting of the scraper means in a plane parallel to the inclined bottom 34 and tank 14. Scraper means 38 is of a length to scrape the lip 34a, the floor of the slot 71 and an appreciable length of the bottom 34 of tank 14 in the vicinity of vertical wall 15.

Referring now to FIGS. 5 and 6, the scraper means 38 is formed preferably as a substantially triangular shaped plate. Scraper means 38 may be formed integral with shaft 82, rigidly secured thereto or secured thereto by means permitting limited rotational action in a single plane. In the embodiment illustrated, scraper means 38 is provided on the top surface with an upstanding post 83. Post 83 is received in the bottom end of pole 82 which is hollowed out to form a sleeve 84. Post 83 is provided with a port 85 through which extends a set screw 86. Set screw 86 seats in an annular groove 87 in post 83 in a manner permitting pivotal movement while it confines the pole 83 against vertical movement. Sleeve 84 is adapted adjacent its lower end with a flange 88 from which depends a stop 89. Post 83 has secured to it an abutment spring 90. Abutment spring 90 cooperates with stops 89 and 91 to return scraper 83 to a preset position after any rotation about the vertical axis of pole 82.

Referring now specifically to FIG. 8, the scraper means 38 depicted is one adapted to provide auxiliary air jet action for the movement of sludge. This scraper means given the designation 95 is formed as an assembly held together by bolts 96 having adjacent confronting faces of two plates 97 and 98 provided with matching grooves so that when the plates are joined together, the scraper has internal bores 100 and 101 terminating at ports 102 and 103 in opposite faces 104 and 105 of the scraper means 95. The top plate 98 of scraper means 95 is bored and tapped from the top to intersect bores 100 and 101 and connector nipples 106 and 107 threaded into the bores. The connector nipples 106 and 107 are externally threaded to receive fittings 108 and 109 for attachment of air hoses 110 and 111 described in connection with FIG. 11. The air hoses are trained along the shaft 70 by any suitable securing facilities.

Referring now specifically to FIG. 9, there is mounted on the pole 82 above the normal liquid level in the tank a valve 112 actuated by a solenoid 113 which in turn is activated by limit switches mounted on trolley 40. Valve 112 receives air through pipe 114 and directs the air to air hose 110 or 111 alternately as the direction of movement of the trolley and scraper suspended therefrom reverses.

Referring now specifically to FIG. 10, there is illustrated an arrangement whereby the scraper 38 is made integral with a hollow pole 82. Air enters pole 82 through conduit 115, passes downward through passage 116 and then out through internal bores in scraper 95 and ports such as port 117.

Referring to FIG. 11, in this further embodiment of the invention, the aeration tank 13 is provided with a mechanical aerator 120 differing from that shown in FIG. 1 only in that the shaft and tube surrounding said shaft are of a length such that the mixing blades 121 are adjacent the bottom of the tank. For stability, it is usually preferable to provide the aerator with legs 122 which contact the tank floor and provide a solid support.

To eliminate poor circulation pockets, tank 13 may be provided with fillets 123 and 124.

Referring to FIG. 12, an embodiment is illustrated which is particularly useful in steel fabricated tanks when air under pressure is available. Tank 125 in this instance is adapted with sloping bottom walls 126 and 127. The low point of walls 126 and 127 terminate at the edge of a sump 128. Sump 128 is provided with one or more ports 129 for drainage which are adapted to receive suitable closure means 130. Mounted within sump 128 is a gas introducing means 131. This means 131 is illustrated as a series of small pipe of 2-inch length and one quarter inch internal diameter vertically extending from and secured to a gas line header 132 which may enter sump 128 through the sidewall.

In this embodiment, if a mechanical aeration means 133 is used in combination, it is provided with a semicircular blank 134 to prevent discharge of aerated mixture toward the baffle wall 135. By limiting the direction of discharge from mechanical aerator 133 and displacing the sump 128 toward the settling tank side of the aeration tank 13, strong circulation is induced which sweeps the sloping bottom wall 126 clean while the turbulence at the lowest point in the aeration tank 125 is effective to keep solids in suspension and substantially prevents accumulation of solids in the bottom thereof.

The sump, with gas disperser positioned therein, operates as a confined space having communication with the main body of liquid only through the open top thereof. In such a sump, baffles are preferebly disposed so that air is introduced through a single open ended tube within a, for example, square segment of sump and is mixed with liquid which enters through the top, i.e. the only open portion of the confined space and the mixture flows therefrom upwardly countercurrent to the entering liquid to impose hydraulic shearing forces on the air bubbles in the mixture. This countercurrent flow creates a turbulence at the low point in the aeration compartment which also distributes the solids entering the sump and entrains them in the upwardly flowing mixture so that they continue to be solids suspended in the main body of circulating mixed liquor in the aeration compartment.

When the scraper is adapted for travel at a rate of 2 feet per minute in a settling tank having a length of 12 feet, sludge settling adjacent the slot 71 will be removed once in each six minute period.

Sewage to be treated at a design rate of 10,000 gallons of raw sewage a day, the volume of mixed liquor being held under aeration, i.e. in the aeration tank 13 may be of the order of 200 cubic feet with an average loading rate of between 85 and 100 pounds of B.O.D. per 1000 cubic feet of aeration tank volume per day. Discharge of mixed liquor to the settling tank 14 having a capacity of 1200 gallons is through baffled ports spaced along wall 15. Effluent separated in the final tank is discharged at a rate of 10,000 gallons per day, the effluent generally having less than 30 mg. per liter of B.O.D.

The above-detailed description of this invention has been given by way of illustration without any intention that the invention be limited to the exact conditions set forth. No unnecessary limitations should be understood, therefore, as modifications will be obvious to those skilled in the art.

I claim:

1. Apparatus for treatment of aqueous waste material which comprises aeration and settling tanks aligned about substantially parallel axes and separated by a common wall partition, said settling tank having a sloping bottom with the low point thereof at an elevation intermedite the normal liquid level of and the bottom of said aeration tank and adjacent the common wall partition, a slot in said common wall partition extending horizontally the length of said partition at an elevation immediately above the line of intersection of said sloping bottom of said settling tank with said common wall partition, means for supplying aqueous waste material to said aeration compartment, liquid communication means for discharging aqueous material from said aeration compartment to said settling compartment, movable scraper means adapted to traverse said settling compartment a distance coextensive with the length of said slot, said scraper means having a height providing a clearance within said slot and being of a length to extend along the portion of the sloping bottom of said settling tank adjacent said common wall partition and at least to the aeration tank side of said slot whereby sludge is directed through said slot, means to move said scraper means, means for aerating the contents of said aeration tank, means for conducting a portion of the sludge concentrated in said settling tank to waste and means for discharging clarified liquid from said settling tank.

2. Apparatus for treatment of aqueous waste material comprising a tank having one sidewall offset laterally intermediate its length with the upper portion of said sidewall spaced outwardly relative to the lower portion thereof, the offset portion sloping downwardly from the lower edge of the upper wall portion to the upper edge of the lower wall portion, a substantially vertical baffle extending upwardly from said sloping wall portion to divided said tank into aeration and settling compartments, said vertical baffle having the bottom thereof spaced from said sloping offset portion of said wall a distance providing a predetermined clearance, means for supplying aqueous waste material to said aeration compartment, liquid communication means for discharging aqueous material from said aeration compartment to said settling compartment, scraper means of a length to extend along a part of said sloping offset wall and at least to the aeration compartment side of said baffle and of a height providing clearance with the bottom of said baffle movable longitudinally of said settling compartment for movement of sludge concentrated in the bottom of said compartment from its original point of deposition and to direct said sludge through the opening between the bottom of said baffle and the offset portion of said tank wall, means to move said scraper means, pole means providing support between said means to move said scrapper means and said scraper means, means for mechanically mixing atmospheric air into liquid material in said aeration compartment, means for conducting a portion of the sludge in said settling compartment to waste and means for discharging clarified liquid from said settling compartment.

3. The apparatus according to claim 2 wherein the means for mechanically mixing atmospheric air into liquid material in said aeration compartment consists of a rotor including a hollow shaft having an open upper end positioned above the normal liquid level in said aeration compartment, and an open bottom end and a plurality of vane elements extending radially from said shaft at the bottom end thereof, means operable to rotate said rotor to produce a region of cavitation in the wake of said vane elements, and means for flowing liquid to said region of cavitation whereby a mixture is discharged radially.

4. The apparatus according to claim 2 wherein the cavitation zone is isolated by top and bottom closure elements and the means for flowing liquid to said region of cavitation is an annular port in the top closure element equiradially positioned about the axis of the hollow shaft.

5. The apparatus according to claim 2 wherein the baffle separating the aeration and settling compartments is positioned intermeidate the vertical axes of said upper and lower portions of said sidewall of said tank.

6. The apparatus according to claim 2 wherein the scrapper means is supported by trolley means operating on the settling tank side of said vertical baffle.

7. The apparatus according to claim 2 wherein the trolley means supports air conduit means communicating with air duct means in said scrapper means, said air ducts terminating in ports at the lateral edges of said scrapper means and positioned to discharge air parallel to the plane of the offset wall portion in a direction to pass through the opening between the bottom of said baffle and the offset portion of said tank wall.

8. The apparatus according to claim 2 wherein the aeration compartment is adapted with bottom walls sloping to a sump displaced from the vertical central axis of said aeration compartment in the direction of said settling compartment, said sump being adapted to with means for discharge of gas under pressure positioned adjacent the bottom of said sump and conduit means for conveying gas to said gas discharge means.

9. The apparatus according to claim 2 wherein the liquid communication means consists of baffled port means for discharging aqueous material from said aeration compartment to said settling compartment.

10. The apparatus according to claim 2 wherein the scraper element is supported from a rail mounted upon the top of tank walls and extending parallel to said vertical baffle by trolley means mounted on said rail for reciprocating movement.

11

11. The apparatus according to claim 2 wherein the scrapper means is supported by trolley means operating on the aeration compartment side of said vertical baffle.

12. The apparatus according to claim 2 wherein the scraper means is mounted at the extremity of said pole means by means permitting pivotal action when said scraper means contacts the walls of said settling tank at the extremities of its reversible movement, abutment means secured to said pole means and spring means secured to said scrapped means adapted to cooperate in returning said scraper means to a preset position after pivotal action.

12

References Cited

UNITED STATES PATENTS

| | | | |
|---|---|---|---|
| 3,207,313 | 9/1965 | Schulze | 210—195 |
| 3,396,102 | 8/1968 | Forrest | 210—221 X |
| 3,414,245 | 12/1968 | Frazer | 261—87 |
| 3,422,007 | 1/1969 | Larkin | 210—15 X |

J. L. DECESARE, Primary Examiner

U.S. Cl. X.R.

210—219, 220, 527